Aug. 28, 1923.

J. G. ACEVES 1,466,036

SPEED CONTROLLING APPARATUS FOR PRIME MOVERS

Filed Oct. 15, 1919      3 Sheets-Sheet 1

INVENTOR
Julius G. Aceves
BY H. H. MacKaye
ATTORNEY

Aug. 28, 1923.

J. G. ACEVES 1,466,036

SPEED CONTROLLING APPARATUS FOR PRIME MOVERS

Filed Oct. 15, 1919   3 Sheets-Sheet 2

INVENTOR
Julius G. Aceves
BY H. M. MacKaye
ATTORNEY

Aug. 28, 1923.
1,466,036
J. G. ACEVES
SPEED CONTROLLING APPARATUS FOR PRIME MOVERS
Filed Oct. 15, 1919    3 Sheets-Sheet 3
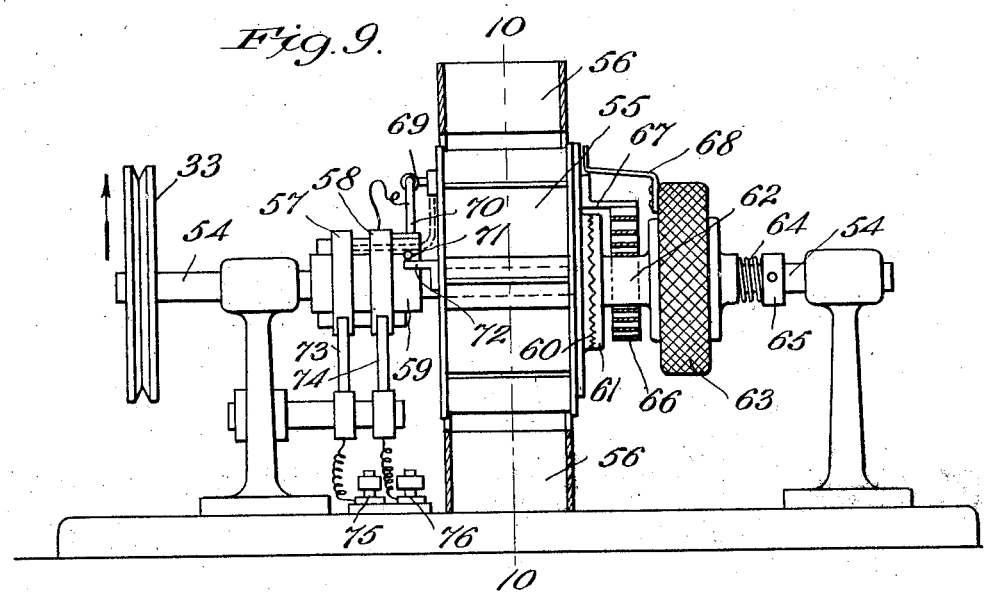
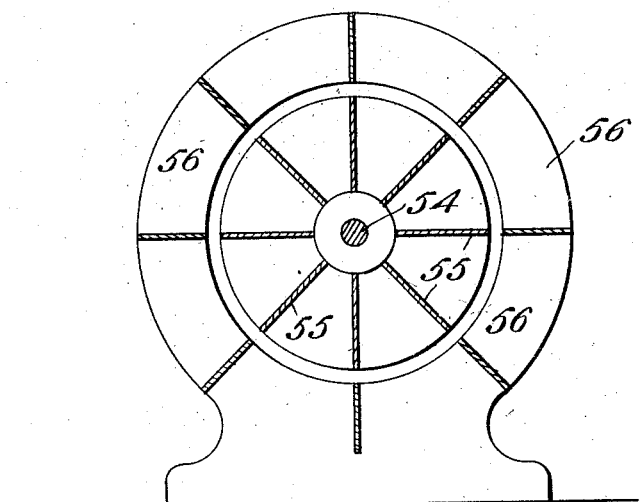
INVENTOR
Julius G. Aceves
BY
ATTORNEY Patented Aug. 28, 1923.

1,466,036

UNITED STATES PATENT OFFICE.

JULIUS G. ACEVES, OF NEW YORK, N. Y., ASSIGNOR OF ONE-HALF TO FRANK P. FAHY, OF NEW YORK, N. Y.

SPEED-CONTROLLING APPARATUS FOR PRIME MOVERS.

Application filed October 15, 1919. Serial No. 330,779.

*To all whom it may concern:*

Be it known that I, JULIUS G. ACEVES, a citizen of the United States, residing in New York city, State of New York, have invented a certain Improvement in Speed-Controlling Apparatus for Prime Movers, of which the following is a specification.

The present invention relates to a new and improved apparatus for the automatic control of motors and engines, by whatever motive force impelled, and the object of the invention is to provide means so arranged as automatically to cause the controlling devices of the prime mover to operate in such a way as to maintain the speed of the prime mover virtually constant, irrespective of changes of any character in the load or power supply.

In my U. S. Patent No. 1,190,839 I have described and claimed apparatus for the purpose above described which depends upon the use of a pilot motor running at constant speed, and wherein the operation of the controlling devices is determined by momentary changes in the relative angular velocities of two rotary members, one of which is driven by the prime mover to be controlled and the other of which is driven at a constant speed by the pilot motor.

In my present invention a revoluble motion-resisting or counter-torque device takes the place of the pilot motor, and in its broadest aspect my invention covers any system wherein a counter-torque device is driven through a resilient transmission and wherein operation of the speed controlling means for the motor or engine to be controlled is determined by changes in the angular relation between two members moving respectively with the prime mover and the pilot generator.

The counter-torque device is of such a nature as to oppose a rapidly increasing resistance to any increase of speed beyond the critical velocity at which it is intended to be driven. It is driven by the prime mover to be controlled through a resilient transmission means (preferably a spring) and in my preferred system this maintains at normal speed a constant separation between two electric contact points (or equivalent determining factors) while causing said points to make contact as soon as increased counter-torque causes extension of the spring. The circuit which is closed by this contact may be used in a great variety of ways to correct incipient speed changes of the prime mover. Some of these are hereinafter described by way of example, although I do not limit myself to the actual examples so set forth.

Figure 9 is a view partly in elevation and partly in section of a mechanical form of counter-torque devices, and Figure 10 is a sectional view of the same on the line 10—10 in Figure 9.

Figure 1:
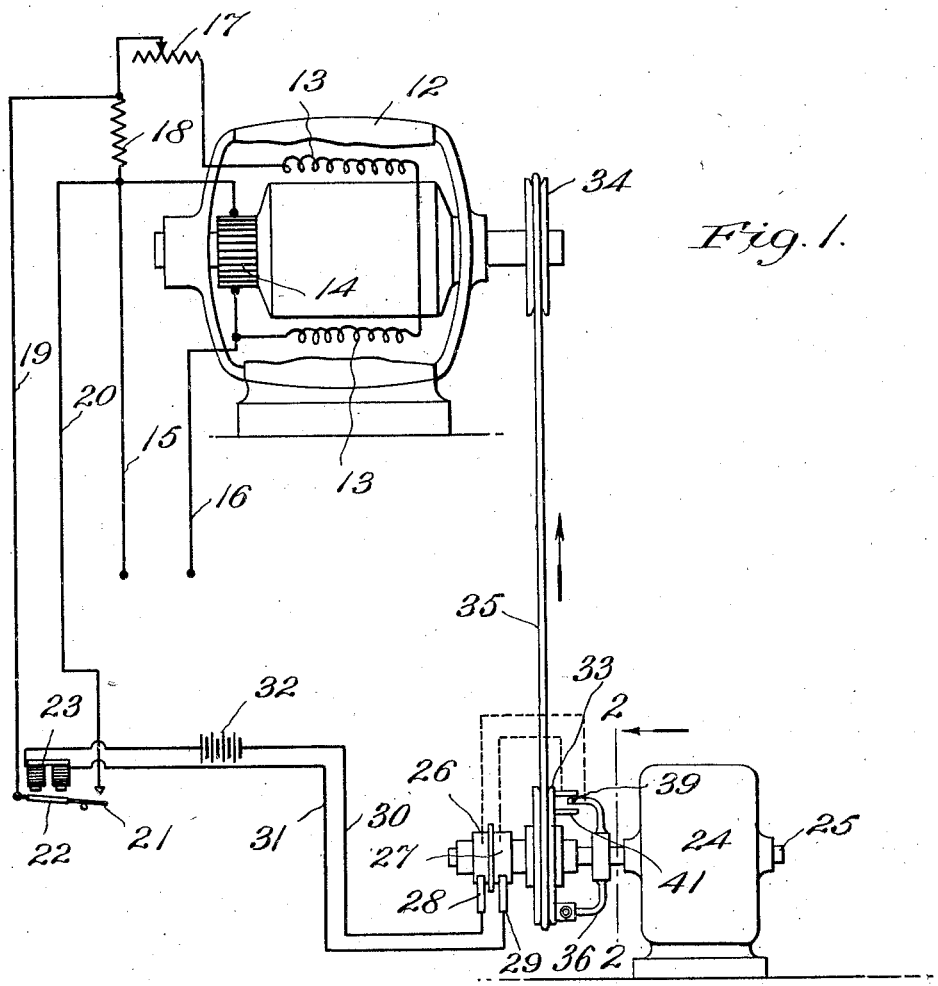
Figure 1 shows a motor in side elevation and a control apparatus driver also in side elevation, with automatic circuit connections between the two.
Figure 2:
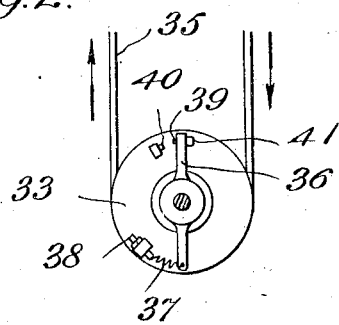
Figure 2 is a side elevation of the switch and pulley on the control apparatus.

Referring to Figures 1 and 2 the prime mover in this figure takes the form of a direct current shunt wound electric motor 12, whose field magnet coils are indicated at 13 and whose armature coils are connected with the usual commutator 14. The leads supplying current to this motor are shown at 15 and 16, and a variable rheostat is shown in the circuit of the coils 13, at 17. The speed controlling means for such a motor may, of course, take a great variety of forms, and in the drawing they comprise the following elements.

In the field magnet circuit there is inserted a special resistance coil or coils 18 with which is connected a short circuiting means. This comprises, in the particular form shown, the leads 19 and 20 which may be bridged by the switch lever 21, provided with an armature 22. This switch is normally open, as shown, but, whenever the magnet 23 is energized, the lever is lifted, thereby short-circuiting the resistance 18, or any desired part thereof. This, of course strengthens the field magnet and tends to slow up the prime mover.

In order automatically to determine operation of the short circuiting means (either through the relay 22, 23, or directly) the following arangement is employed.

At 24 is shown a counter-torque device, by which is meant any revoluble body or system adapted to oppose a sufficiently prompt and rapid increase in resistance to motion (counter-torque) upon occurrence of any increase beyond a critical speed. In the figure this is supposed to represent a pilot generator, suitably loaded, the same being driven by the shaft 25 bearing slip rings 26 and 27 upon which bear the contact brushes 28, 29, connected by the wires 30 and 31 to the battery 32 and relay magnet 23, as shown.

Turning loosely upon the shaft 25 is a pulley 33, driven from the prime mover by means of the pulley 34 and belt 35. The arrows show the direction of rotation.

The cross piece 36 is fast upon the shaft 25, and is provided with two arms extending toward the pulley 33, as shown. One of these arms is connected with the pulley 33 through the resilient transmission, which, in the modification shown, takes the form of a tension spring 37, made adjustable by attachment to a threaded bolt 38 on the pulley.

The opposite arm of the cross piece 36 is provided with an insulated contact point 39, and a second insulated contact point 40 is fixed to the pulley 33 in the path of movement of the point 39. As indicated by dotted lines in Figure 1, these two contact points are connected electrically each with one of the slip rings 26, 27. A back stop for the upper arm of the cross piece is shown fixed to the pulley 33.

It will readily be understood that the characteristics of the pilot generator 24 can be so calculated that, beyond a certain critical speed, the resistance to motion of the generator rises quite sharply. The pulleys 33 and 34 are so calculated that the former turns with approximately this critical velocity when the prime mover is running at the speed which is intended for it and which it is desired to maintain practically constant. With this end in view, the operation is as follows.

The tension of the spring 37 is adjusted so that it will just serve to overcome the counter-torque of the pilot generator at the critical speed, and will thereby hold the points 39 and 40 separated a distance limited by the stop 41. It is of course understood that the tension on the spring 37 acts through the cross piece 36 to revolve the shaft 25 of the generator 24, and that this tension is always sufficient to hold the points 39 and 40 apart while the prime mover is being started and until the desired critical speed is reached.

If after this speed is reached, there is any increase in speed, the generator 24 will at once exert an increased counter-torque, and the spring 37 will suffer a slight extension, thereby permitting the points 39 and 40 to touch. The result will be a short circuiting of the special resistance 18, strengthening the field magnet of the prime mover and causing the same to run more slowly. In the form shown the relay magnet 23 is used for this purpose, its circuit being closed through the battery 32, the slip rings 26, 27 and the points 39 and 40. It will be understood however that, in some cases, this relay may be suppressed.

It is to be further understood that my invention is not limited to the control of an electric prime mover, but that all kinds of prime movers may be governed by my apparatus; the appropriate form of controlling device being employed in each case.

A great variety of counter-torque devices is also within the scope of my invention. Where great torque-speed sensitivity is desired a counter-torque pilot apparatus may be used so constructed that the torque varies much more rapidly than the speed. For instance, the generator shown in Figure 1 at 24 may be considered to be a direct current generator connected to a resistance having a negative temperature characteristic. In such a case, since the resistance decreases with increase of temperature due to increased current, the current itself and therefore the counter-torque will increase more rapidly than the speed.

Where a very high speed-torque sensitivity is desired, I may invoke the principle of electrical resonance. For this purpose I may employ in place of the generator 24 an alternating current motor used as a generator. An asynchronous motor with a rotor of the squirrel cage type is preferred, although a synchronous motor may be used as a generator for the purpose above named. The general principle upon which the arrangement in question is founded is illustrated by the diagram in Figure 3, wherein the rotor of such a pilot generator is indicated at 42 and the stator coils at 43. A condenser 44 is placed directly in the exterior circuit of the stator, and this condenser is so calculated as to permit the setting up of alternating currents of a predetermined frequency as soon as the pilot generator reaches a certain speed. Under these circumstances the apparatus acts as an induction generator drawing its exciting current from the condenser instead of from an outside source.

Figure 3:
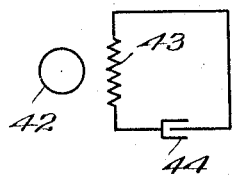
Figure 3 is a diagram of the pilot generator and condenser showing the electrical connections between the two.

Assuming as a practical example a four pole, 60 cycle single phase induction motor connected as shown in Figure 3; let L be the total effective self-inductance of the circuit and C the capacitance of the condenser 44. Now, when the rotor 42 is driven at the critical speed of generation, oscillations are produced in the external circuit, whose frequency is expressed by the equation $$f = \frac{1}{2\pi\sqrt{LC}}$$

The synchronous speed for any induction generator is determined by the equation $$\text{RPM} = \frac{120f}{N}$$

where $f$ is the frequency of the current and N the number of poles of the generator. I have found that the critical speed at which the oscillations develop is between 105 and 150% of the synchronous speed, depending upon the design of the machine used.

Figure 4:
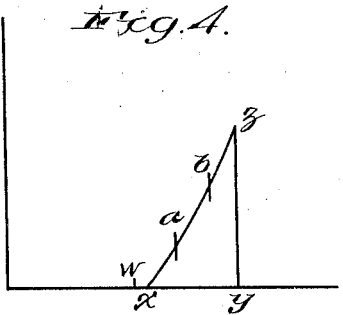
Figure 4 is a graphic diagram illustrating the theory of the devices.

In Figure 4 is shown a typical curve, illustrating the action of the induction generator, the ordinates representing current and the abscissæ representing speed. Let the point $w$ represent the synchronous speed for 60 cycles, and $y$ critical speed at which oscillations suddenly develop. Then the ordinate $yz$ will indicate the value of the current spontaneously developed in the external circuit in Figure 3 at the critical speed.

The oscillations having been once set up, by attainment of the critical speed, if the speed is then decreased, the current curve will be approximately of the form shown in Figure 4; and if the pilot generator 42, 43, be operated at a speed such as $a$ on this curve, it is clear that a very small increase of speed, as for instance to the point $b$, will produce a relatively large counter-torque, due to the fact that under the conditions named, the counter-torque changes approximately in proportion to the square of the current change, and this current change is exceedingly great for small speed changes.

It is clear that, where a pilot generator of this character is driven in this way for the purposes of my invention its speed should never be allowed to fall below the point represented by $x$ in Figure 4, as in that case the current would fall to zero, and could only be restored by bringing the generator back to the critical speed $y$ to regain self-excitation.

In carrying out the operations just alluded to, it is to be remarked that the growth of potential, and therefore of current, is extremely rapid at and around the critical speed. In practice a certain degree of overspeeding is very difficult to avoid, and where this occurs to even a slight extent the rise of voltage and current would be actually dangerous, were it not for the increase in effective resistance caused by the current as the result of iron losses in the stator winding.

Figure 5:
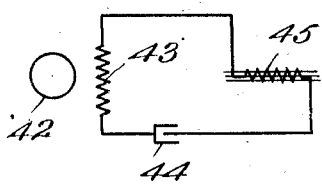
Figure 5 is a diagram illustrating the connection of the pilot motor with a condenser and induction coil.

It will often be advisable, however, for the sake of safety, to augment the losses in the resonance circuit, to limit both the voltage and the current attained, and for this purpose I may insert in the circuit of Figure 3 an effective resistance as indicated at 45 in Figure 5. This may assume various forms, as, for instance a solenoid with an iron core so adapted as to give rise to hysteresis or eddy current losses, or both. Control by an extra resistance of this general character permits of adjustment of the speed-torque sensitivity of the pilot generator.

As above pointed out, the critical speed $x$ depends upon both the capacitance of the condenser 44 and upon the self-inductance of the stator windings. While the capacitance may be of known and fixed value, the original self-inductance of the stator depends mainly upon the permeability of the iron in the magnetic circuit, which varies greatly, as it depends upon the magnetic condition in which the iron was left after former periods of operation. If conditions are such that the initial permeability is low, considerable overspeeding may be required to produce self-excitation, and this may be objectionable.

Figure 6:
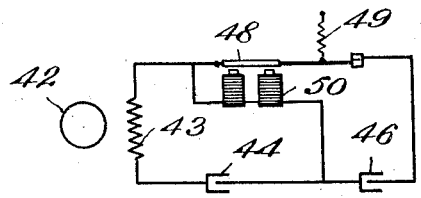
Figure 6 is a similar diagram showing modified electrical connections for the pilot motor.

In order to compensate for variable self-inductance and to insure self-excitation at speeds not exceeding, say, 105% of synchronous speed, I may adopt the arrangement shown in Figure 6, wherein an extra capacitance is employed during initial speeding up of the pilot generator, and is automatically cut out after the critical speed is reached, and operating conditions are set up.

In this arrangement the external circuit of the stator 43 includes, in addition to the working condenser 44, the starting condenser 46; and in series with these is a pair of contact points 47 and a switch lever 48 controlling their contact. The spring 49 normally preserves contact at 47, while an electro-magnet 50, whose evils are in a shunt circuit between the two condensers 44 and 46, acts, when energized, to open the circuit through 46, at 47.

While coming up to speed, the condensers 44 and 46 are in multiple, and their combined capacitance in this condition should be such as to cause self-excitation of about 105% of the operating speed. It is necessary, however, to remove the starting condenser 46 after self-excitation, as otherwise the pilot generator will operate at a synchronous speed lower than that at which it is intended to work, which should be determined by the working condenser 44 and the final effective self-inductance of the circuit. This cutting out of the starting condenser is accomplished by the magnet 50 as soon as the establishment of critical speed starts the flow of current.

Figure 7:
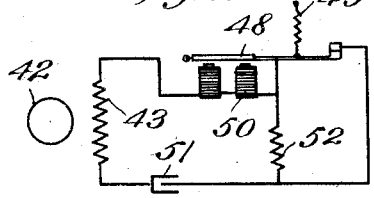
Figure 7 is a similar diagram showing another modification of the electrical devices connected with the pilot motor.

In Figure 7 I have shown a modified arrangement wherein the total capacitance of the condensers 44 and 46 is combined in a single condenser 51, and wherein the proper working condition is produced by causing the magnet 50 to open a starting short-circuit at 47, thus bringing a resistance 52 into the resonance circuit in series with the condenser 51.

Figure 8:
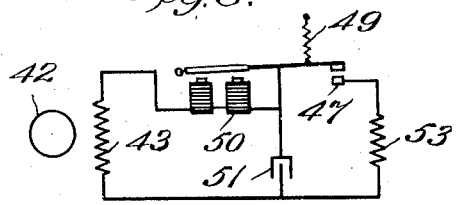
Figure 8 is a diagram showing still another modification of the electrical devices connected with the pilot motor.

In Figure 8, the condenser 51 of combined working and starting capacitance is combined with a suitably proportioned resistance 53 which is brought into multiple arc relation with said condenser by the action of the magnet 50 on occurrence of the resonance current. This also has the effect of reducing the virtual capacitance of the condenser 51 to an amount appropriate to the foreseen working conditions, as above explained.

My present invention is not limited to an arrangement wherein the counter-torque device takes the form of an electric generator or the like. In Figures 9 and 10 I have shown one of various forms of purely mechanical counter-torque devices capable of use in this connection.

Here the counter-torque device takes the form of a rotary fan from whose shaft 54 radiate the blades 55. This fan is surrounded by an impedance device, for the purpose of increasing the fan's resistance to acceleration at a high critical velocity. This device preferably takes the form of a series of chambers 56, arranged circumferentially around the fan blades, whereby the air otherwise driven away from the fan will be crowded back against the fan, forming eddies, and thus opposing a considerable resistance to rotation of the fan. When the fan reaches a high rotative velocity, the resistance or counter-torque increases in a much higher ratio than any given increase in velocity, and the device therefore supplies a very sensitive pilot apparatus for use as a substitute for the generator 24 in the combination already described.

In the particular form shown in Figures 9 and 10, this last named modification is constructed as follows. The driving pulley 33 is fast on the shaft 54, as are the slip rings 57 and 58 and the extra ring 59. On the opposite side of the fan, (whose blades turn loosely on the shaft 54) there is a toothed disc 60, fast on the shaft. Facing this disc 60 is a similar toothed disc 61, adapted to engage with the toothed or ridged face of the disc 60 in any relative angular arrangement of the two. The disc 61 is fixed to a sleeve 62, loose on the shaft 54, and preferably furnished with a knurled ring 63 to facilitate manipulation.

Engagement between the ridged faces of the discs 60 and 61 is normally assured by pressure of the spring 64, which is compressed between the loose slidable sleeve 62 and the abutment 65 which is fixed on the shaft 54.

The spiral spring 66 (affording the resilient transmission means heretofore alluded to) is fixed to the abutment 67 on the fan at one end, and at the other end to the sleeve 62. It is so arranged as to be wound up by turning the sleeve 62 clockwise as viewed from the right in Figure 9.

It will thus be seen that the initial tension of the spring 66 can always be adjusted by drawing the discs 60 and 61 apart, turning the sleeve 62 one way or the other and then bringing the discs 60 and 61 together again. The degree of initial tension will thus be indicated by the pointer 68 which can be made to cooperate with suitable markings (not shown) upon the right hand face of the fan.

When the pulley 33 is revolved in the direction of the arrow in Figure 9, the disc 60, acting through the disc 61 and sleeve 62 will exert such a tension upon the spring 66 as to drive the fan at the desired critical speed (as already explained with reference to Figures 1 and 2). The fan carries a contact member 69 connected as shown with a slip ring 57, while the extra ring 59 carries a second contact member 70, connected with the other slip ring 58. During normal running these contact members are separated by a distance limited by the pin 71 on the ring 59 and the stop 72 on the fan. If, however, there is an incipient increase of speed in the fan, the increased resistance to the fan will cause it to lag, bringing the contact members together and closing the external circuit through the brushes 73 and 74, connected to the binding posts 75, 76. This will slow up the prime mover as heretofore described, and the contact members 69 and 70 will be again separated, preparatory to a repetition of the operation just described.

Various other modifications of my apparatus may be employed without departing from the scope of my invention, and I do not limit myself to the details herein shown and described.

What I claim is:—

1. In an automatic speed controlling apparatus, a motive device to be controlled, an alternating current motor used as a generator and operated as a counter-torque device, a condenser in series with the stator coils of said counter-torque device, two members adapted to revolve respectively with said motive device and said counter-torque device, and speed controlling means adapted to be operated by changes in the relative angular relation of said members.

2. The combination generally set forth in claim 1 hereof, wherein a variable resistance coil is used in series with the condenser to modify the resonance characteristics of the circuit.

3. The combination set forth in claim 1 hereof, wherein two condensers are in circuit with the stator coils of the counter-torque device in combination with an electromagnetic switch also in circuit with said coils and adapted when energized, to remove one of said condensers from effective relation to said circuit.

In testimony whereof I have hereto set my hand on this 10th day of October 1919.

JULIUS G. ACEVES.